United States Patent [19]

Sharpe et al.

[11] 3,929,583
[45] Dec. 30, 1975

[54] APPARATUS FOR ENUMERATING MICROORGANISMS

[75] Inventors: Anthony N. Sharpe, Aylmer; Gregory L. Michaud, Manotick, both of Canada

[73] Assignee: Canadian Patents and Development Limited, Ottawa, Canada

[22] Filed: Aug. 14, 1975

[21] Appl. No.: 497,285

[52] U.S. Cl. ............................ 195/127; 195/139
[51] Int. Cl.² ................................... C12K 1/04
[58] Field of Search ................... 195/127, 139

[56] References Cited
UNITED STATES PATENTS
2,761,813  9/1956  Goetz .......................... 195/139

OTHER PUBLICATIONS
Microbiological Analysis of Water, Millipore Application Report AR-81, pp. 20–21.

Primary Examiner—Alvin E. Tanenholtz
Attorney, Agent, or Firm—Ronald G. Bitner

[57] ABSTRACT

A membrane filter, adapted to retain microorganisms on its surface when a fluid sample is passed through it, has imprinted on said surface, in a gridded pattern, a barrier material which defines a plurality of microbial colony isolating cells that prevent colony spreading and confluence. Each cell has an area smaller than the normal colony size so that after incubation each existent colony is uniform in size and shape, and has high visiblity. The gridded filter facilitates colony detection and counting and makes possible high colony density counts. In one embodiment, the gridded filter is mounted in a container which is particularly suited for automated handling.

10 Claims, 7 Drawing Figures

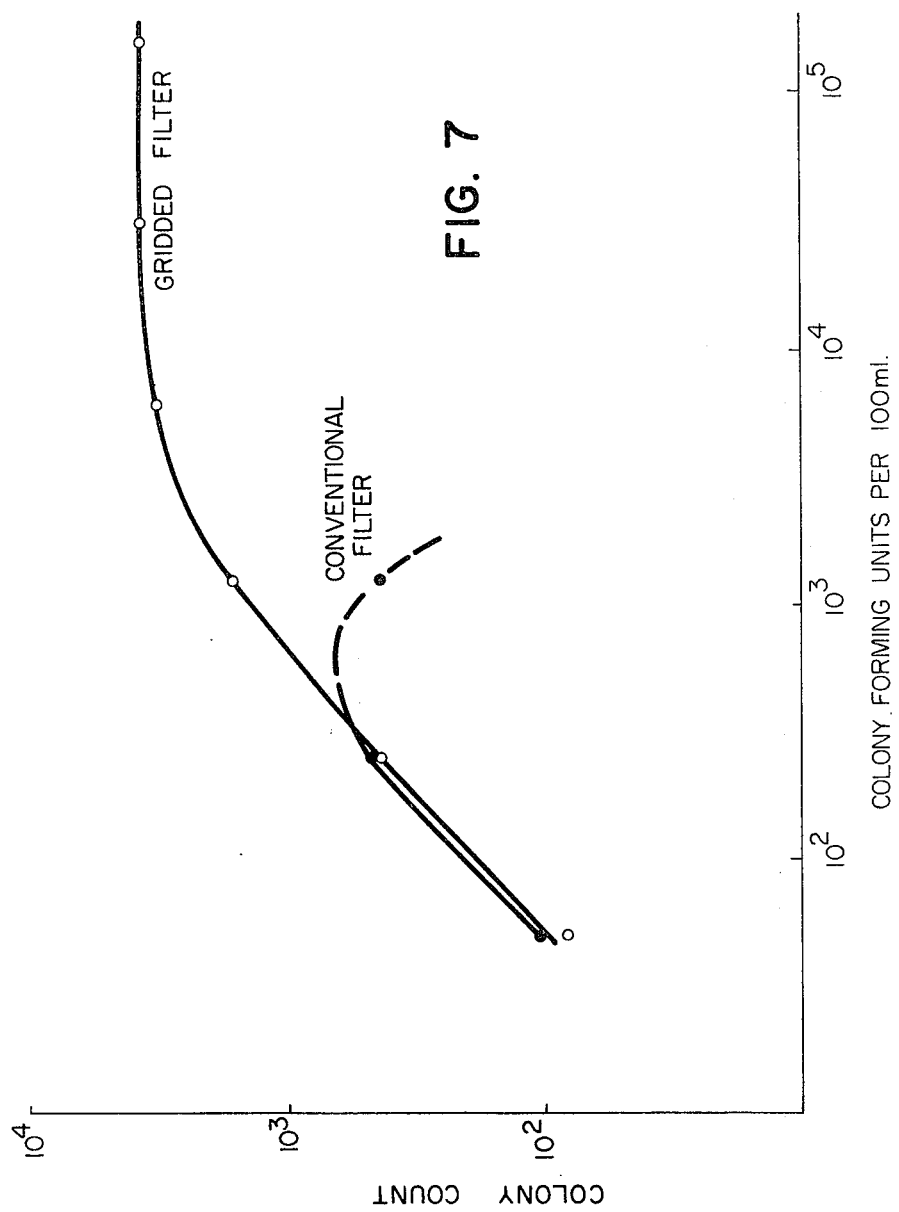

3,929,583

APPARATUS FOR ENUMERATING MICROORGANISMS

BACKGROUND OF THE INVENTION

This invention relates to apparatus that facilitates the enumeration of microorganisms.

In many areas of microbiology it is important for the number of microorganisms in a sample to be enumerated accurately. Such information is needed in, for example, the testing of foods or water for pathogenic or spoilage bacteria, or the testing of urine in cases of suspected urinary tract infections.

A commonly used method for enumerating microorganisms is to filter a suitably diluted sample using a membrane filter through which the microorganisms will not pass, thereby inoculating the filter with the microorganisms. The inoculated membrane filter is then placed on the surface of a nutritive jelly or on a pad soaked in a nutrient solution in a petri plate. In either case, nutrient permeates the filter and allows the microorganisms to grow as visible colonies on the surface of the filter during incubation, after which they can be counted.

With present practice the labour involved in carrying out a count of microorganisms is considerable. One step which involves considerable labor is the accurate counting of the microbial colonies on the surface of the membrane filter.

A variety of optoelectronic devices are available which can scan a membrane filter and display a number related to the total colony count. The accuracy of such devices, however, is not entirely satisfactory since the initiation of a counting pulse is effected by a change in the optical density of the filter between a sterile area and an area covered by a microbial colony, and many sources of error are present, for example, the presence of defects such as debris, surface irregularities, or variations between colonies in their optical density, size, sharpness and the uniformity of their radii. A colony may, for example, occur as a diffuse patch with low optical density and with little change in optical density at its border. Such a colony is difficult to detect optoelectronically. Moreover, when the sensitivity of an automatic counter is increased so that it will respond to such colonies, it also becomes much more sensitive to the other sources of error described above. It is essential at present for a human operator to examine each filter counted by an optoelectronic instrument, since such instruments are unable to distinguish between the case of few or no colonies growing on the filter, and a large number of colonies growing as a uniform confluent mass. This latter case could be dangerous without the prior examination of the filter by the human operator.

Another step which involves considerable labor is the making of several dilutions of the sample in order to obtain a range of colony densities when the concentration of microorganisms on the sample cannot be approximately predicted. This procedure is necessary because the presence of only very few colonies on the filter will not give a statistically significant answer. On the other hand, when too many colonies are present on the filter they will overlap and separating them visually into individual colonies may be difficult or even impossible.

With conventional filters, the maximum colony density that can be reliably counted optoelectronically still covers only a small fraction of the total area being scanned. When, therefore, colonies grow in randomly located positions, as with present practice, the entire area must be scanned and since the ratio of the area unoccupied by colonies to that occupied by colonies is large, the numbers of false counts, due to defects or debris on the filter being in proportion to this ratio, tend also to be large.

SUMMARY OF THE INVENTION

An object of the present invention is to provide an apparatus that facilitates the enumeration of microorganisms.

A specific object is to provide an apparatus that facilitates counting of microbial colonies grown on a membrane filter.

A more specific object is to provide that the size, shape and optical density of microbial colonies that grow on a membrane filter surface are relatively uniform.

Another object is to provide a membrane filter that prevents overlapping or confluence of microbial colonies.

Another object is to enable a wide range of microbial concentrations to be counted and to reduce the number of dilutions required to provide a suitable density of colonies on a membrane filter.

Another object is to facilitate high density counts on a membrane filter.

Another object is to provide high optical contrast between microbial colonies and the surface of a membrane filter.

A further object of the present invention is to provide an apparatus that facilitates automated counting of microorganisms.

Another object is to provide that existent colonies on a membrane filter are disposed at predetermined locations or in an orderly pattern to facilitate optoelectronic counting.

The present invention provides an apparatus to facilitate enumeration of microorganisms comprising a membrane filter element for retaining on a surface thereof the microorganisms present in a fluid sample filtered thereby, the filter element having imprinted on said surface a barrier material in a pattern defining a plurality of ordered, microbial colony isolating cells, wherein the cells are smaller in area than the normal colony area.

BRIEF DESCRIPTION OF THE DRAWINGS

FIG. 7 illustrates graphically the experimentally determined difference in colony count between a gridded membrane filter of the present invention and a conventional membrane filter.

DESCRIPTION OF PREFERRED EMBODIMENTS

Figure 1:
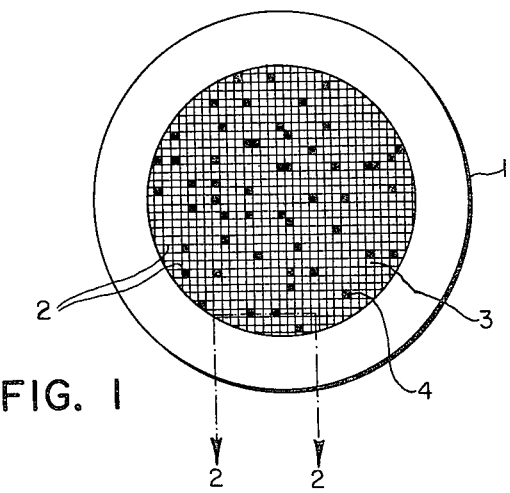
FIG. 1 is a plan view of a membrane filter imprinted with a barrier material in a rectangular gridded pattern and showing a number of microbial colonies.
Figure 2:
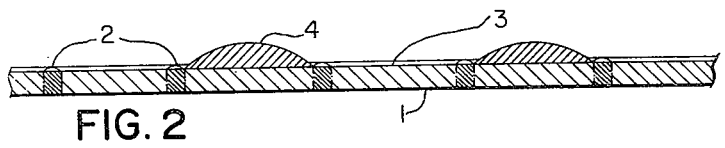
FIG. 2 is an enlarged section taken at 2—2 of FIG. 1.

Referring to FIGS. 1 and 2, a membrane filter element 1 has imprinted on its surface, in a rectangular gridded pattern of intersecting lines, a barrier material 2 defining a plurality of cells 3 for isolating individual microbial colony forming units 4. The barrier material 2 limits lateral growth and prevents spreading and confluence of the colonies 4.

The cells 3 are provided with an area smaller than the area normally expected for the microbial colonies 4 so that the colonies 4 tend to grow perpendicular to the surface of the membrane filter, increasing in thickness and thus enhancing the optical contrast between the colony and filter. At the same time the overlapping and confluent growth of colonies which reduces their countability on conventional membrane filters is avoided. Also, since each colony is constrained to grow with a smaller surface area a much greater density of colonies can be allowed to grow on the surface of the membrane filter. Therefore, for a sample containing a high microbial concentration, a smaller number of dilutions are required.

The barrier material may be imprinted in any convenient pattern that facilitates counting. In the preferred embodiment of FIG. 1 the pattern is a rectangular grid. With a rectangular grid the position of any cell can be described by two co-ordinates so that the position of the center of a cell can be accurately and easily predetermined. Therefore, a scanning and counting apparatus need examine only a central point of each cell so that the need to scan all areas of the filter, as with present practice, is eliminated and errors are considerably reduced.

Figure 3:
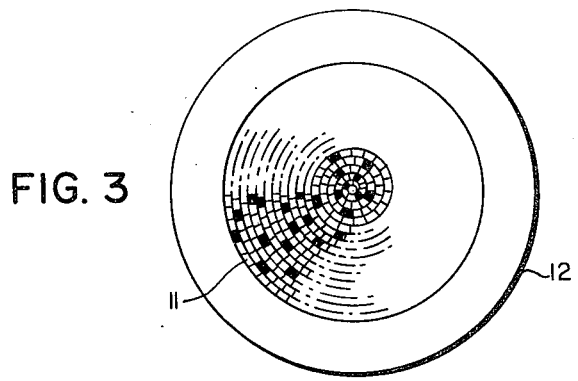
FIG. 3 is a plan view of a membrane filter imprinted with a barrier material in a spiral gridded pattern.
Figure 4:
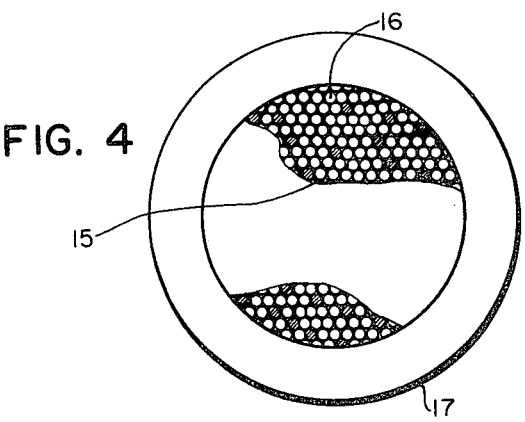
FIG. 4 is a plan view of a membrane filter imprinted with a barrier material in a pattern defining circular colony cells.

FIGS. 3 and 4 illustrate examples of alternate barrier patterns. In FIG. 3 the cells 11 on the membrane filter 12 are arranged in a spiral. In FIG. 4 the barrier material 15 defines circular cells 16 on the membrane filter 17.

The barrier material may be any material capable of being attached in some manner to or modifying the surface of the membrane filter such that the spread of organisms is inhibited, but must not be of a material capable of causing inhibition of the growth of microorganisms on the free surface of the membrane filter through the leaching out of soluble inhibitory substances. Thus the barrier material must be capable of restricting the spread of colonies through its physical or mechanical properties. The requirements of the barrier material are non-wettability, impermeability to nutrients or microorganisms, low toxicity to microorganisms, insolubility, and physical or chemical properties allowing it to be attached to the membrane. The barrier material may, for example, comprise hydrocarbon wax, petrolatum, silicone wax or oil, epoxy resin, polytetrafluoroethylene or polystyrene solutions, rubber, acrylics, and bees wax.

Suitable methods of imprinting the chosen pattern on the membrane filter will be apparent to those skilled in the art of printing on paper or plastics, but reasonable precautions should be taken to avoid contaminating the membrane filter with microorganisms. Alternatively, the imprinted membrane filters may be sterilized before use by any normally acceptable sterilizing means such as gamma-irradiation or ethylene oxide gas treatment.

Preferably, sufficient barrier material will be deposited in the printing process to penetrate the entire thickness of the membrane, as illustrated in FIG. 2, so that the nutrient available for the colony forming unit of an individual cell is limited, thereby reducing the possibility of the colony spreading to other cells. The printing process will preferably also provide that the barrier material leaves a raised surface on the filter to act as an additional mechanical barrier or wall.

Although the optimum cell size will depend on the growth rate of the microorganism or the counting method, it appears that the cell area should range between approximately 25 mm$^2$ and 0.05 mm$^2$. 25 mm$^2$ appears to be the upper size limit since most bacteria colonies do not grow much larger than this. The lower size limit is determined by the ability of the printing process to reproduce the desired pattern without completely obliterating the pores of the membrane.

It appears that the width of the barrier should be at least 0.025 mm wide since narrower lines are difficult to reproduce reliably or to stop colonies from growing across. However, the ability to separate colonies will be improved by using a barrier material that forms raised surfaces. Increasing line thickness beyond that essential for reliable separation of colonies reduces the useful area of the membrane filter. However, wide lines, e.g., 2.5 mm or wider may be useful if, for example, it is desired to pick out colonies for sub-culture.

The membrane filter will preferably be of the type normally used in microbiology known as an absolute filter, that is, a filter whose pores are smaller than the microorganisms being filtered so that all microorganisms are retained on its surface.

The imprinted membrane of the present invention may be inoculated and incubated in the same manner as a conventional membrane filter for enumeration of microorganisms. Specifically, a suitably diluted sample is passed through the membrane filter leaving the microorganisms on the imprinted surface. A nutrient is supplied by, for example, applying a nutrient jelly to the opposite surface of the filter, or by placing the filter on a nutrient jelly or on a pad soaked in a nutrient solution. After incubation the number of colonies may be counted by visual inspection as with conventional membrane filters. However, the regularity in size, shape, optical density and orderly arrangement of colonies, as a result of the gridded pattern of barrier material, considerably facilitates the manual counting process, saving time and reducing errors. Alternatively, the imprinted membrane filter may be counted automatically by a suitable optoelectronic scanning device. The colony counts of gridded filters obtained by conventional automatic counting means will likewise be more accurate than those obtained using conventional membrane filters. Moreover, when an optoelectronic instrument is used to determine, for example, the level of microbial contamination in foods, the imprinted filters eliminate the danger of recording falsely low values as may happen when the concentration of colonies is very high and confluence occurs.

Figure 5:
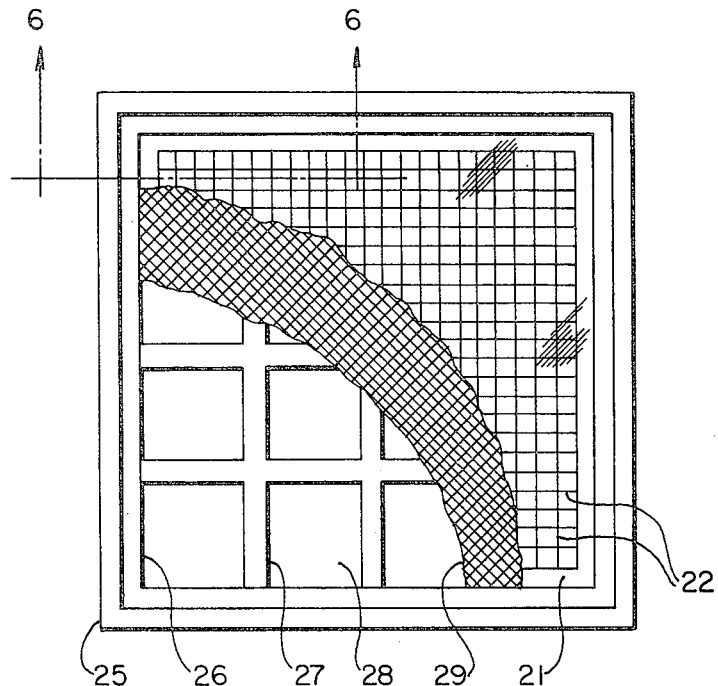
FIG. 5 is a fragmented plan view of a gridded membrane filter mounted in a container.
Figure 6:
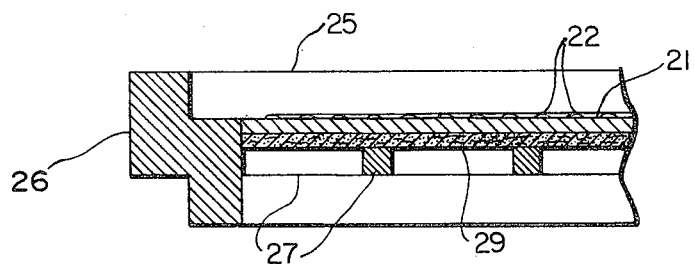
FIG. 6 is an enlarged fragmented sectional view taken at 6—6 of FIG. 5.

In the embodiment of FIGS. 5 and 6, a membrane filter 21, imprinted with a suitable gridded pattern of barrier material 22, as previously described, is mounted in a rigid or semi-rigid container 25. With a rectangular grid pattern as in FIG. 5, the container preferably also has a corresponding rectangular shape. The container comprises a frame portion 26 and a base portion 27 in the form of a lattice that defines openings 28 to allow passage of fluid. Between the membrane filter 21 and the base portion 27 is a pad 29 of absorbant material for retaining a nutrient solution.

The frame portion 26 is shaped to facilitate stacking of a plurality of similar containers. For automated optoelectronic counting the membrane filter of each container may be accurately positioned and fastened to the container so that the imprinted pattern is in a predetermined position relative to the frame of the container making it unnecessary for the scanning apparatus to be aligned with respect to the pattern.

For automated operation, a stack or magazine of such containers may be introduced into a suitable apparatus within which containers are successively dispensed and transported through a succession of stations comprising filtration means, nutrient addition means, incubation means and colony counting means. In this way nearly all the labour or enumerating microorganisms can be eliminated.

EXAMPLE

Cellulose ester membrane filters, HAWP 04700, 0.45 micron pore size (Millipore Filter Corp.) or Metrical GA-6 (Gelman Instrument Company), were imprinted with a square grid pattern of parafin hydrocarbon wax (melting point 55°C), with lines 0.125 mm wide and 0.5 mm apart, using a zinc plate engraving prepared from a master drawing. The plate was coated with a suitable thickness of molten wax using a roller. A membrane filter was laid on the face of the plate and pressed into contact with the plate by gentle pressure from a second sterile roller in order to transfer the wax. The filter was then removed using sterile forceps and stored in a sterile container until used. Between printing successive filters, both the zinc plate and the molten parafin wax were kept warm on an electric hot plate. A culture of *Serratia marcescens* was grown overnight in a nutritive broth and diluted in 0.1% peptone solution to give 200 ml suspensions containing approximately 50; 250; 1,250; 6,300; 31,300; and 156,000 colony forming units in 100 ml. 100 ml of suspension was filtered through a membrane filter prepared according to the method described above, and the filter was laid on the surface of sterile nutritive agar in a Petri dish. The remaining 100 ml was filtered through a conventional membrane filter, and laid on agar in the same way. The other suspensions were treated in exactly the same way. After incubation at 20°C for 24 hours, red colonies of *S. marcescens* were counted, except when the confluence of colonies at high concentrations on the conventional membrane filters made counting impossible.

Colony counts on the two types of filters are shown in FIG. 7. It can be seen that the count on conventional membrane filters reached a maximum at about 400 colony forming units and rapidly became completely uncountable after this as a result of confluence. In contrast, the gridded membrane filters still gave an increasing count at 10,000 colony forming units, and the count did not fall off at values higher than this. Thus, the invention provides for the enumeration of *S. marcescens* or other microorganisms through a range at least 25 times greater than can be obtained with conventional membrane filters, and this can save a considerable amount of time in analysis where it might otherwise be necessary to make dilutions of the sample being analysed.

What is claimed is:

1. An apparatus to facilitate enumeration of microorganisms comprising a membrane filter element for retaining on a surface thereof the microorganisms present in a fluid sample filtered thereby, said filter element having imprinted on said surface, a barrier material, which restricts the spread of colonies through its physical properties, in a pattern defining a plurality of ordered, microbial colony isolating cells, wherein the cells are smaller in area than the normal colony area.

2. The apparatus of claim 1 wherein the pattern is a rectangular grid.

3. The apparatus of claim 1 wherein the area of each cell is less than 25 mm$^2$.

4. The apparatus of claim 1 wherein the width of barrier material for dividing the cells is greater than 0.025 mm.

5. The apparatus of claim 1 wherein the pattern penetrates the thickness of the membrane filter.

6. The apparatus of claim 1 wherein the barrier material is selected from the group comprising hydrocarbon wax, petrolatum and silicone wax.

7. The apparatus of claim 1 wherein the fluid sample is a liquid.

8. The apparatus of claim 1 wherein said membrane filter is mounted in a container comprising a surrounding frame portion and an apertured base portion.

9. The apparatus of claim 8 further comprising a nutrient retaining means disposed between the membrane filter and the base portion.

10. The apparatus of claim 8 wherein the frame portion is shaped for nesting with another similar container.

* * * * *